UNITED STATES PATENT OFFICE.

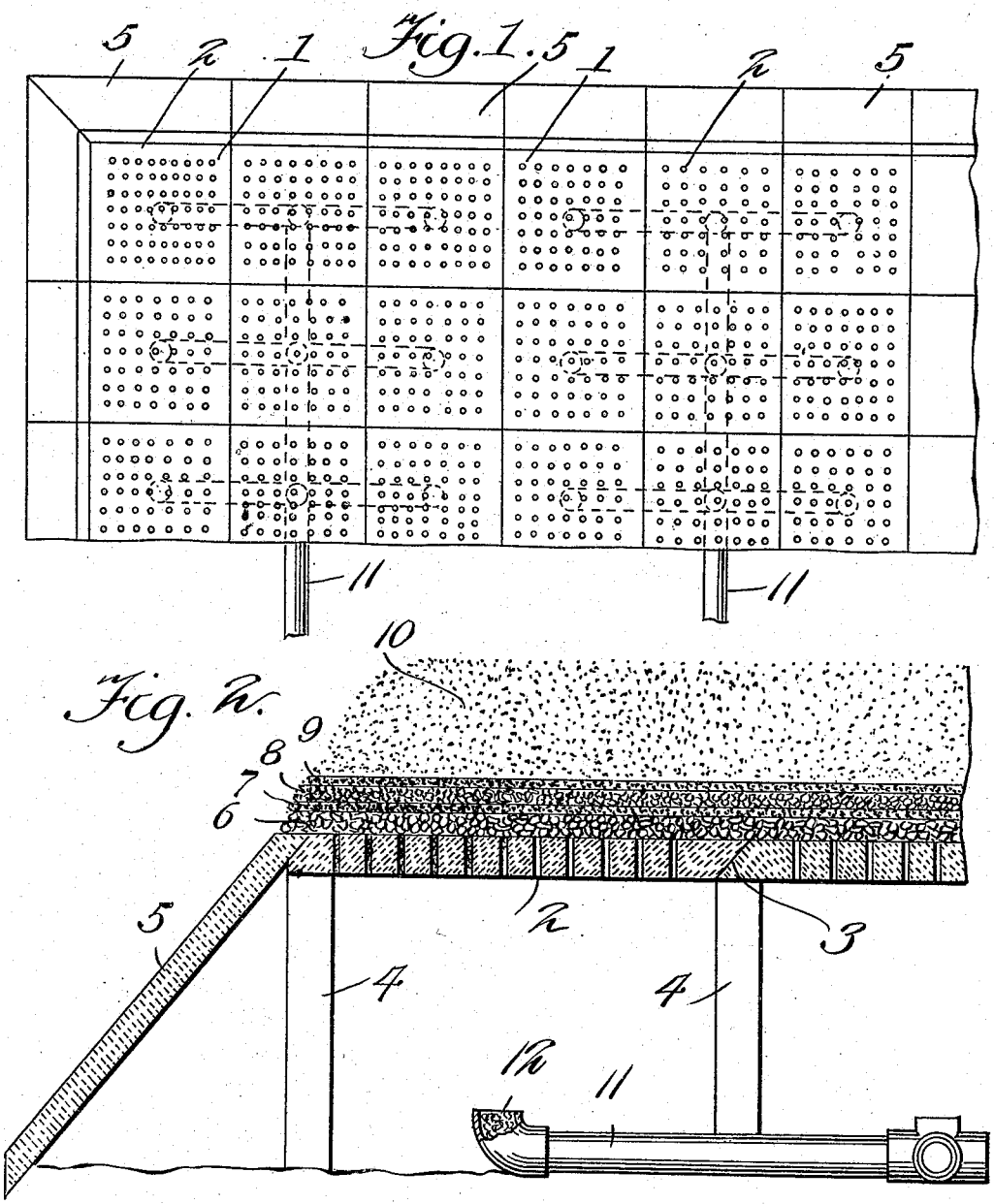

PAUL F. BUSSMAN, OF BUFFALO, NEW YORK.

FILTERING-BED.

No. 931,032.  Specification of Letters Patent.  Patented Aug. 17, 1909.

Application filed April 24, 1908. Serial No. 429,063.

*To all whom it may concern:*

Be it known that I, PAUL F. BUSSMAN, a citizen of the United States of America, residing at Buffalo, in the county of Erie and State of New York, have invented new and useful Improvements in Filtering-Beds, of which the following is a specification.

This invention relates to filtering beds for water supply systems, and one of the principal objects of the same is to provide a filtering bed at the bottom of the lake, stream or river from which the water supply is furnished and to locate the suction pipes immediately under the filter bed so that the water drawn into the inlet ends of the suction pipes is filtered before it is conveyed to the reservoir to be supplied to the city or town.

Heretofore it has been the usual practice to take the water from the bed of a stream or lake and convey it to a reservoir where a filtering plant is required to filter the water before it is furnished to the city or town.

It is the principal object of my invention to filter the water before it is admitted to the reservoir, thus saving in the expense of filtration after the water has been supplied to the reservoir.

The objects and advantages above referred to may be attained by means of the construction illustrated in the accompanying drawing, in which,—

Figure 1 is a plan view of a perforated platform partially broken away for sustaining a filtering bed, and showing the suction pipes underneath the platform. Fig. 2 is a sectional view showing a filtering bed made in accordance with my invention.

Referring to the drawing for a more specific description of my invention, the numeral 1 designates rectangular blocks of concrete or plates of metal provided with suitable perforations 2, said perforations extending through the plate or block, and a series of such plates or blocks being arranged preferably with beveled edges 3 and supported upon suitable legs 4 a slight distance above the bed of a river, lake or stream from which the water supply is to be furnished. Extending around the platform and inclosing the underside thereof are the plates or slabs of concrete 5 forming an inclined wall completely around the platform. Placed upon the platform thus made is a layer of large broken stone 6. This layer may be two or more inches in thickness. Placed upon the layer 6 of stone is a layer of coarse gravel 7, and upon this layer another layer of still finer gravel 8, and then a layer 9 of sand and gravel mixed may be placed upon the layer 8, while the top layer 10 may be of six or eight inches thickness and composed of fine white sharp sand. However, it will be understood that other filtering materials may be used and that any required thickness of layer may be resorted to. The suction pipes 11 are provided with curved intake joints 12, and these pipes may be arranged, as shown in Fig. 1, provided with suitable branches spaced apart and each branch having an intake joint or nozzle 12.

From the foregoing it will be obvious that the filter bed is inclosed upon all sides and that the water to be supplied through the suction pipes 11 must be drawn through the filter bed. Thus the supply of water at the reservoir will be comparatively clear and limpid.

The openings in the platform may be made quite large, and these openings may be filled with asbestos, mineral wool or other material to act as a secondary filter. The open ends of the pipes for drawing off the filtered water may also be supplied with asbestos, mineral wool or other filtering substance to still further purify the water.

Having thus described the invention, what is claimed as new, is:—

The herein described filtering bed comprising a platform made up of rectangular blocks provided with perforations, said platform being supported above the bed of a stream and provided with inclined imperforate side and end walls which entirely inclose the space underneath the platform, filtering material placed upon the platform, and suction pipes extending through the side walls, said suction pipes being disposed underneath the platform with their intake ends directed upwardly, the perforations in said blocks being filled with filtering material and the mouth of the intake pipes containing the filtering material.

In testimony whereof I affix my signature in presence of two witnesses.

PAUL F. BUSSMAN.

Witnesses:
CLEMENS A. BUSSMAN,
L. VOGT.